(12) United States Patent
Michaud et al.

(10) Patent No.: US 12,152,175 B2
(45) Date of Patent: Nov. 26, 2024

(54) COMPOSITION MADE FROM (METH)ACRYLATE MONOMERS

(71) Applicants: BOSTIK SA, Colombes (FR); UNIVERSITE DE HAUTE-ALSACE, Mulhouse (FR); CENTRE NATIONAL DE LA RECHERCHE SCIENTIFIQUE, Paris (FR)

(72) Inventors: Guillaume Michaud, Lyons (FR); Frédéric Simon, Venette (FR); Stéphane Fouquay, Venette (FR); Jacques Lalevee, Mulhouse (FR)

(73) Assignees: BOSTIK SA, Colombes (FR); UNIVERSITE DE HAUTEALSACE, Mulhouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 202 days.

(21) Appl. No.: 17/779,406

(22) PCT Filed: Nov. 24, 2020

(86) PCT No.: PCT/FR2020/052154
§ 371 (c)(1),
(2) Date: May 24, 2022

(87) PCT Pub. No.: WO2021/105603
PCT Pub. Date: Jun. 3, 2021

(65) Prior Publication Data
US 2023/0022325 A1    Jan. 26, 2023

(30) Foreign Application Priority Data

Nov. 25, 2019 (FR) .................. FR1913176

(51) Int. Cl.
*C09J 4/00* (2006.01)
*C09J 4/06* (2006.01)
(Continued)

(52) U.S. Cl.
CPC . *C09J 4/06* (2013.01); *C09J 4/00* (2013.01); *C09J 5/00* (2013.01); *C09J 11/06* (2013.01);
(Continued)

(58) Field of Classification Search
CPC ........................................ C09J 4/00
See application file for complete search history.

(56) References Cited

U.S. PATENT DOCUMENTS

| | | | |
|---|---|---|---|
| 2,967,173 A * | 1/1961 | Fang | C07D 317/36 |
| | | | 526/225 |
| 2014/0231009 A1* | 8/2014 | Chitnavis | C09J 147/00 |
| | | | 156/332 |
| 2015/0225626 A1 | 8/2015 | Murray et al. | |

FOREIGN PATENT DOCUMENTS

| | | |
|---|---|---|
| CN | 102898963 A | 1/2013 |
| WO | 2008014466 A2 | 1/2008 |

OTHER PUBLICATIONS

Shaabin, "The effect of inhibitor and initiator concentration on degree of conversion, flexural strength and polymerization shrinkage stress on resin-matrix composite," Masters Thesis, Indiana University School of Dentistry (2009). (Year: 2009).*

(Continued)

*Primary Examiner* — Catherine S Branch
(74) *Attorney, Agent, or Firm* — NK Patent Law (57) ABSTRACT

The present invention relates to a two-component composition comprising: —a composition A comprising: —at least one reducing agent; —at least one (meth)acrylate monomer; —a composition B comprising: —at least one oxidising agent; and—optionally at least one (meth)acrylate mono-
(Continued)

mer; the composition being characterised in that: —it comprises at least one radical photoinitiator in composition A and/or B; —it comprises at least one polymerisation inhibitor in an amount less than or equal to 0.3% by weight relative to the total weight of the composition.

16 Claims, 1 Drawing Sheet

(51) Int. Cl.
  *C09J 5/00* (2006.01)
  *C09J 11/06* (2006.01)
  *C09J 11/08* (2006.01)
  *C09J 133/14* (2006.01)

(52) U.S. Cl.
  CPC ............ *C09J 11/08* (2013.01); *C09J 133/14* (2013.01); *C09J 2433/00* (2013.01); *C09J 2491/00* (2013.01)

(56) References Cited

OTHER PUBLICATIONS

ISA/EP; International Search Report and Written Opinion for International Patent Application No. PCT/FR2020/052154 dated Feb. 18, 2021, 11 pages.

* cited by examiner

COMPOSITION MADE FROM (METH)ACRYLATE MONOMERS

CROSS-REFERENCE TO RELATED APPLICATIONS

This application is a U.S. National Stage application of International Patent Application No. PCT/FR2020/052154, filed on Nov. 24, 2020, which claims the benefit of French Patent Application No. FR1913176, filed on Nov. 25, 2019.

FIELD OF THE INVENTION

The present invention relates to a (meth)acrylate-monomer-based composition.

The invention also relates to the use of said composition in the repair and/or the semi-structural or structural adhesive bonding of materials in the transportation, marine, assembly, electronics or construction field.

TECHNOLOGICAL BACKGROUND

Acrylic compositions are reactive systems that are known to crosslink by radical polymerization. They are used as adhesives, sealants and coatings. Radical polymerization is typically initiated by a redox system which, by means of an oxidation-reduction reaction, results in the production of radicals.

Most acrylic systems are two-component systems. The first component conventionally contains the reducing agent and the reactive monomers, and the second component contains the oxidizing agent. Once the two components have been mixed, the reducing agent induces cleavage of the O—O bond of the organic peroxide for example, and initiates polymerization.

However, one of the problems of this technique is inhibition by oxygen. This is because the oxygen present in air in its triplet state will interact with the radicals formed at the surface of the sample, thus preventing them from initiating polymerization. This inhibition is essentially expressed at the surface since there is very little or no deep penetration of the oxygen depending on the grammage exposed. In addition, the polymerization reaction is often slow for surfaces exposed to atmospheric oxygen, which surfaces, that are partially polymerized, often remain tacky.

There is a need for new (meth)acrylic compositions which make it possible to at least partially solve at least one of the abovementioned drawbacks.

More particularly, there is a need for new (meth)acrylic compositions which allow rapid deep polymerization.

There is a need for new (meth)acrylic compositions which allow a good compromise between reactivity and storage stability.

DESCRIPTION OF THE INVENTION

A. Composition

The present invention relates to a two-component composition comprising:
  a composition A comprising:
  at least one reducing agent;
  at least one (meth)acrylate monomer;
  a composition B comprising:
  at least one oxidizing agent; and
  optionally at least one (meth)acrylate monomer;
said composition being characterized in that:
  it comprises at least one radical photoinitiator in composition A and/or B;
  it comprises at least one polymerization inhibitor in a content of less than or equal to 0.3% by weight relative to the total weight of said composition.

Reducing Agent

The reducing agent can be chosen from tertiary amines, sodium metabisulfite, sodium bisulfite, transition metals, azo compounds, alpha-aminosulfones, and mixtures thereof.

Among the azo compounds, mention may for example be made of azoisobutyric acid.

Among the alpha-sulfones, mention may for example be made of bis(tolylsulfonymethyl)benzylamine.

Among the tertiary amines, mention may for example be made of diisopropanol-p-toluidine (DIIPT); dimethyl-p-toluidine; dipropoxy-p-toluidine; dimethylaniline; N,N-dimethylaminomethylphenol; N, N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; and N,N-diethyl-p-bromoaniline; the amines having formula (I) or (II) below; and mixtures thereof:

in which:
  m and n are, independently of one another, an integer ranging from 1 to 150, preferably from 1 to 100, preferentially from 1 to 72, advantageously from 1 to 36, even more advantageously from 1 to 18;
  r is an integer ranging from 1 to 200, preferably from 1 to 104, preferentially from 1 to 72, advantageously from 1 to 36;
  $R^1$ represents a radical chosen from the group consisting of a linear or branched, saturated or unsaturated alkyl comprising from 1 to 20 carbon atoms, preferably from 1 to 10 carbon atoms; a (hetero)aryl comprising from 6 to 12 carbon atoms; a cycloalkyl comprising from 3 to 12 carbon atoms;

v represents an integer ranging from 0 to 5;

$R^2$ and $R^3$ represent, independently of one another, a halogen atom, a hydrogen atom or a linear or branched alkyl group comprising from 1 to 12 carbon atoms, said alkyl group being optionally interrupted by at least one oxygen atom;

$R^4$ represents a hydrogen atom, an arylalkyl group, or a linear or branched alkyl group comprising from 1 to 20 carbon atoms, preferably an alkyl group comprising from 1 to 12 carbon atoms, advantageously from 1 to 6 carbon atoms;

on the condition that m+n>2, preferably n+m≥2.5.

In the abovementioned formula (I), v is preferably 1, and $R^1$ is preferably in the para-position.

The amines of formula (I) are preferably chosen from those in which:

$R^1$ represents a linear or branched, saturated or unsaturated alkyl comprising from 1 to 20 carbon atoms, preferably from 1 to 10 carbon atoms; preferentially, $R^1$ represents methyl;

m and n represent, independently of one another, an integer ranging from 1 to 18, preferably from 1 to 9, advantageously from 1 to 5;

$R^2$ and $R^3$ represent, independently of one another, a hydrogen atom or a linear or branched alkyl group comprising from 1 to 12 carbon atoms, said alkyl group being optionally interrupted by at least one oxygen atom; preferably, $R^2$ and $R^3$ each represent a hydrogen atom;

with m+n>2, preferably n+m≥2.5.

Preferably, the amines of formula (I) are those in which:

$R^1$ represents a linear or branched alkyl comprising from 1 to 5 carbon atoms; preferentially, $R^1$ represents methyl;

m and n represent, independently of one another, an integer ranging from 1 to 18, preferably from 1 to 9, advantageously from 1 to 5;

$R^2$ and $R^3$ represent a hydrogen atom;

with the fact that m+n>2, preferably n+m≥2.5.

Among the amines of formula (I), mention may for example be made of Bisomer® PTE (CAS number: 878391-30-1) sold by Geo Specialty Chemicals, Accelerator PT25E (CAS number: 878391-30-1) sold by Lanxess, N,N-bis(2-hydroxypropyl)-p-aniline (CAS number: 3077-13-2) available from Biosynth, N,N-bis(2-hydroxypropyl)-p-toluidine (CAS number: 38668-48-3) sold by BASF, Ethox ANA-10 (CAS number: 36356-83-9) available from Ethox Chemical.

In the abovementioned formula (II), v is preferably 1, and $R^1$ is preferably in the para-position.

The amines of formula (II) are preferably chosen from those in which:

$R^1$ represents a linear or branched, saturated or unsaturated alkyl comprising from 1 to 20 carbon atoms, preferably from 1 to 10 carbon atoms; preferentially, $R^1$ represents methyl;

r represents an integer ranging from 1 to 36, preferably from 1 to 18, advantageously from 1 to 10;

$R^3$ represents a halogen atom, a hydrogen atom or a linear or branched alkyl group comprising from 1 to 12 carbon atoms, said alkyl group being optionally interrupted by at least one oxygen atom;

$R^4$ represents a hydrogen atom, an arylalkyl group, or a linear or branched alkyl group comprising from 1 to 20 carbon atoms, preferably from 1 to 6 carbon atoms.

Among the amines of formula (II), mention may for example be made of N-(2-hydroxyethyl)-N-methylaniline (CAS number: 93-90-3) available from Sigma-Aldrich and N-(2-hydroxyethyl)-N-methyl-p-toluidine (MHPT, CAS number: 2842-44-6) available from Parchem.

Preferably, composition A comprise at least one tertiary amine as reducing agent, and even more preferentially an amine of formula (I) mentioned above.

Composition A may comprise a total content of reducing agent(s) ranging from 0.5% to 5%, preferably from 1% to 3%, by weight relative to the total weight of said composition A.

Oxidizing Agent

The oxidizing agent can be chosen from peroxides, organic salts of transition metals, compounds containing a labile chlorine, and mixtures thereof.

The peroxides can be chosen from organic peroxides, inorganic peroxides, and mixtures thereof.

Among the inorganic peroxides, mention may be made of peroxydisulfuric acid and salts thereof, such as ammonium peroxodisulfate, sodium peroxodisulfate and potassium peroxodisulfate.

Among the organic peroxides, mention may be made of cumene hydroperoxide, para-menthane hydroperoxide, tert-butyl peroxyisobutyrate, tert-butyl peroxybenzoate, tert-butyl peroxyneodecanoate, tert-amyl peroxypivalate, acetyl peroxide, benzoyl peroxide, dibenzoyl peroxide, 1,3-bis-(t-butylperoxyisopropyl)benzene, diacetyl peroxide, t-butyl-cumyl peroxide, tert-butyl peroxyacetate, cumyl peroxide 2,5-dimethyl-2,5-di-t-butylperoxyhexane, 2,5-dimethyl-2,5-di-t-butyl-peroxyhex-3-yne, 4-methyl-2,2-di-t-butylperoxypentane, and mixtures thereof.

Preferably, composition B comprises benzoyl peroxide as oxidizing agent.

Composition B may comprise a total content of oxidizing agent(s) ranging from 0.5% to 5%, preferably from 1% to 3%, by weight relative to the total weight of said composition B.

The composition according to the invention can typically comprise a redox system, a reducing agent which is included in composition A and an oxidizing agent which is included in composition B. Mention may for example be made of the following combinations:

persulfates (oxidizing agent)/(sodium metabisulfite and/or sodium bisulfite) (reducing agents);

organic peroxides (oxidizing agent)/tertiary amines (reducing agent);

organic hydroperoxides (oxidizing agent)/transition metals (reducing agent).

Radical Photoinitiator

The composition according to the invention can be polymerized or crosslinked under electromagnetic radiation.

The composition according to the invention can comprise from 0.1% to 5% by weight, preferably from 0.5% to 3% by weight, even more preferentially from 1% to 2% by weight, of radical photoinitiator(s), relative to the total weight of the composition.

The radical photoinitiator is preferably present in composition A.

The radical photoinitiator can be any radical photoinitiator known to those skilled in the art. Under the action of UV/visible radiation, the radical photoinitiator generates radicals which will be responsible for the initiation of the photopolymerization reaction, and makes it possible in particular to increase the efficiency of the photopolymerization reaction. This is, of course, chosen as a function of the light source used, according to its ability to efficiently absorb the radiation selected. It will be possible, for example, to choose the appropriate radical photoinitiator from its UV/visible absorption spectrum. Advantageously, the radical photoinitiator is appropriate for working with irradiation sources emitting in the near zone of the visible region. Advantageously, the source of the UV or visible radiation can be an LED.

Preferably, said at least one radical photoinitiator is chosen from the group consisting:
of radical photoinitiators of type I chosen from:
the family of the acetophenones and alkoxyacetophenones, such as, for example, 2,2-dimethoxy-2-phenylacetophenone and 2-diethyl-2-phenylacetophenone;
the family of the hydroxyacetophenones, such as, for example, 2,2-dimethyl-2-hydroxyacetophenone, 1-hydroxycyclohexyl phenyl ketone, 2-hydroxy-4'-(2-hydroxyethoxy)-2-methylpropiophenone and 2-hydroxy-4'-(2-hydroxypropoxy)-2-methylpropiophenone;
the family of the alkylaminoacetophenones, such as, for example, 2-methyl-4'-(methylthio)-2-morpholinopropiophenone, 2-benzyl-2-(dimethylamino)-4-morpholinobutyrophenone and 2-(4-methylbenzyl)-2-(dimethylamino)-4-morpholinobutyrophenone;
the family of the benzoin ethers, such as, for example, benzil, benzoin methyl ether and benzoin isopropyl ether;
the family of the phosphine oxides, such as, for example, diphenyl(2,4,6-trimethylbenzoyl)phosphine oxide (TPO), ethyl(2,4,6-trimethylbenzoyl)phenylphosphine oxide (TPO-L) and bis(2,6-dimethoxybenzoyl)-2,4,4-trimethylphenylphosphine oxide (BAPO);
the family of the metallocenes, such as, for example, ferrocene, bis(eta5-2,4-cyclopentadien-1-yl)bis(2,6-difluoro-3-(1H-pyrrol-1-yl)phenyl)titanium and (cumene)(cyclopentadienyl)iron hexafluorophosphate;
of radical photoinitiators of type 11 chosen from:
the family of the benzophenones, such as, for example, 4-phenylbenzophenone, 4-(4'-methylphenylthio)benzophenone or 1-[4-[(4-benzoylphenyl)thio]phenyl]-2-methyl-2-[(4-methylphenyl)sulfonyl]-1-propanone;
the family of the thioxanthones, such as, for example, isopropylthioxanthone (ITX), 2,4-diethylthioxanthone, 2,4-dimethylthioxanthone, 2-chlorothioxanthone and 1-chloro-4-isopropylthioxanthone;
the family of the quinones, such as, for example, anthraquinones, including 2-ethylanthraquinone, and camphorquinones;
the family of the benzoylformate esters, such as, for example, methyl benzoylformate;
the family of the dibenzylidene ketones, such as, for example, the p-dimethylamino ketone;
the family of the coumarins, such as, for example, 5-methoxy- and 7-methoxycoumarin, 7-diethylaminocoumarin and N-phenylglycine coumarin;
of radical photoinitiators of the family of the dyes, such as, for example, triazines, fluorones, cyanines, safranins, 4,5,6,7-tetrachloro-3',6'-dihydroxy-2',4',5',7'-tetraiodo-3H-spiro[isobenzofuran-1,9'-xanthen]-3-one, pyryliums and thiopyryliums, thiazines, flavins, pyronines, oxazines or rhodamines;
and of mixtures thereof.

More preferably, said at least one radical photoinitiator is chosen from the group consisting:
of radical photoinitiators of type I chosen from:
the family of the acetophenones and alkoxyacetophenones, such as, for example, 2,2-dimethoxy-2-phenylacetophenone and 2-diethyl-2-phenylacetophenone;
the family of the hydroxyacetophenones, such as, for example, 2,2-dimethyl-2-hydroxyacetophenone, 1-hydroxycyclohexyl phenyl ketone, 2-hydroxy-4'-(2-hydroxyethoxy)-2-methylpropiophenone and 2-hydroxy-4'-(2-hydroxypropoxy)-2-methylpropiophenone;
the family of the alkylaminoacetophenones, such as, for example, 2-methyl-4'-(methylthio)-2-morpholinopropiophenone, 2-benzyl-2-(dimethylamino)-4-morpholinobutyrophenone and 2-(4-methylbenzyl)-2-(dimethylamino)-4-morpholinobutyrophenone;
the family of the benzoin ethers, such as, for example, benzil, benzoin methyl ether and benzoin isopropyl ether;
the family of the phosphine oxides, such as, for example, diphenyl(2,4,6-trimethylbenzoyl)phosphine oxide (TPO), ethyl(2,4,6-trimethylbenzoyl)phenylphosphine oxide (TPO-L) and bis(2,6-dimethoxybenzoyl)-2,4,4-trimethylphenylphosphine oxide (BAPO);
the family of the metallocenes, such as, for example, ferrocene, bis(eta5-2,4-cyclopentadien-1-yl)bis(2,6-difluoro-3-(1H-pyrrol-1-yl)phenyl)titanium and (cumene)(cyclopentadienyl)iron hexafluorophosphate;
of radical photoinitiators of type 11 chosen from:
the family of the benzophenones, such as, for example, 4-phenylbenzophenone, 4-(4'-methylphenylthio)benzophenone or 1-[4-[(4-benzoylphenyl)thio]phenyl]-2-methyl-2-[(4-methylphenyl)sulfonyl]-1-propanone;
the family of the thioxanthones, such as, for example, isopropylthioxanthone (ITX), 2,4-diethylthioxanthone, 2,4-dimethylthioxanthone, 2-chlorothioxanthone and 1-chloro-4-isopropylthioxanthone;
the family of the benzoylformate esters, such as, for example, methyl benzoylformate;
the family of the dibenzylidene ketones, such as, for example, the p-dimethylamino ketone;
the family of the coumarins, such as, for example, 5-methoxy- and 7-methoxycoumarin, 7-diethylaminocoumarin and N-phenylglycine coumarin;
of radical photoinitiators of the family of the dyes, such as, for example, triazines, fluorones, cyanines, safranins, 4,5,6,7-tetrachloro-3',6'-dihydroxy-2',4',5',7'-tetraiodo-3H-spiro[isobenzofuran-1,9'-xanthen]-3-one, pyryliums and thiopyryliums, thiazines, flavins, pyronines, oxazines or rhodamines;
and of mixtures thereof.

More preferably, the radical photoinitiator is chosen from the following radical photoinitiators:
the family of the phosphine oxides, such as, for example, diphenyl(2,4,6-trimethylbenzoyl)phosphine oxide (TPO), ethyl(2,4,6-trimethylbenzoyl)phenylphosphine oxide (TPO-L) and bis(2,6-dimethoxybenzoyl)-2,4,4-trimethylphenylphosphine oxide (BAPO);
the family of the thioxanthones, such as, for example, isopropylthioxanthone (ITX), 2,4-diethylthioxanthone, 2,4-dimethylthioxanthone, 2-chlorothioxanthone and 1-chloro-4-isopropylthioxanthone;
the radical photoinitiator being even more preferentially chosen from diphenyl-(2,4,6-trimethylbenzoyl)phosphine oxide (TPO), ethyl-(2,4,6-trimethylbenzoyl)phenylphosphine oxide (TPO-L) and bis-(2,6-dimethoxybenzoyl)-2,4,4-trimethylphenylphosphine oxide (BAPO).

For example, when the source of the UV or visible radiation is an LED, the radical photoinitiator can be chosen from 2,4,6-trimethylbenzoyldiphenylphosphine or TPO available, for example, from Lambson under the commercial reference Speedcure® TPO (CAS: 75980-60-8), ethyl (2,4,6-trimethylbenzoyl)phenylphosphinate or TPO-L available, for example, from Lambson under the commercial reference Speedcure® TPO-L (CAS: 84434-11-7), phenylbis(2,4,6-trimethylbenzoyl)phosphine oxide or BAPO (CAS: 162881-26-7) available, for example, from BASF under the commercial reference Irgacure® 819, 2-benzyl-2-dimethylamino-1-(4-morpholinophenyl)-1-butanone (CAS: 119313-12-1) available, for example, from BASF under the commercial reference Irgacure® 369, 2-methyl-1[4-(methylthio)phenyl]-2-(4-morpholinyl)-1-propanone (CAS: 71868-10-5) available, for example, from BASF under the commercial reference Irgacure® 907, 1-hydroxycyclohexyl phenyl ketone (CAS: 947-19-3) available, for example, from BASF under the commercial reference Irgacure® 184, 2-isopropylthioxanthone or ITX (CAS: 5495-84-1) available, for example, under the reference Speedcure® 2-ITX, or mixtures thereof.

Polymerization Inhibitor

The composition according to the invention comprises at least one polymerization inhibitor. The content of the latter in the composition is therefore strictly greater than 0 ppm (part per million by weight).

The total content of polymerization inhibitor(s) is preferably less than or equal to 0.25%, preferentially less than or equal to 0.20% by weight, and advantageously less than or equal to 0.10% by weight relative to the total weight of said composition.

Preferably, the composition comprises from 0.01% to 0.20% by weight of polymerization inhibitor(s) relative to the total weight of said composition.

The polymerization inhibitor may be any type of polymerization inhibitor known to those skilled in the art.

In may for example be chosen from hydroquinone, hydroquinone monomethyl ether (4-hydroxyanisole, MEHQ), 1,4-benzoquinone, 1,4-napthoquinone, catechol, pyrogallol, bisphenol A, para-(tert-butyl)phenol, phenothiazine, and mixtures thereof.

More preferably, the polymerization inhibitor is hydroquinone monomethyl ether (MEHQ).

(Meth)Acrylate Monomer

The (meth)acrylate monomers in composition A and in composition B may be identical or different.

The (meth)acrylate monomers can comprise one (monofunctional) or more (polyfunctional) (meth)acrylate functions.

The (meth)acrylate monomer(s) can be chosen from the group consisting of:

compounds having formula (III) below:

$$H_2C=C(R^5)-COOR^6 \quad (III)$$

in which:
R$^5$ represents a hydrogen atom or a methyl group;
R$^6$ is chosen from the group consisting of alkyls, cycloalkyls, alkenyls, cycloalkenyls, alkylaryls, arylalkyls or aryls, it being possible for said alkyls, cycloalkyls, alkenyls, cycloalkenyls, alkylaryls, arylalkyls or aryls to be optionally substituted and/or interrupted by at least one silane, one silicone, one oxygen, one halogen, one carbonyl, one hydroxyl, one ester, one urea, one urethane, one carbonate, one amine, one amide, one sulfur, one sulfonate, or one sulfone;
polyethylene glycol di(meth)acrylates;
tetrahydrofuran (meth)acrylates;
hydroxypropyl (meth)acrylate;
hexanediol di(meth)acrylate;
trimethylol propane tri(meth)acrylate;
diethylene glycol di(meth)acrylate;
triethylene glycol di(meth)acrylate;
tetraethylene glycol di(meth)acrylate;
dipropylene glycol di(meth)acrylate;
di(pentamethylene glycol) di(meth)acrylate;
diglyceryl tetra(meth)acrylate;
tetramethylene di(meth)acrylate;
ethylene di(meth)acrylate;
bisphenol A mono- and di(meth)acrylates;
bisphenol F mono- and di(meth)acrylates;
compounds of formula (IV) or (V) below:

(IV)

(V)

in which:
R$^7$ represents H or a methyl;
R$^8$ represents H or ethyl;
p represents 0 or 1; and
Z represents H$_1$ =O, a linear or branched alkyl group, a benzyl group, an aryl group or an alkoxy group;
mixtures thereof.

According to one embodiment, the (meth)acrylate monomer is chosen from methyl (meth)acrylate, ethyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, 3-vinylcyclohexyl (meth)acrylate, bornyl (meth)acrylate, 2,4,5-tri-t-butyl-3-vinylcyclohexyl (meth)acrylate, 2,3,4,5-tetra-t-butylcyclohexyl (meth)acrylate; benzyl (meth)acrylate, phenyl (meth)acrylate, 2-(2-ethoxyethoxy)ethyl (meth)acrylate, 2-phenoxyethyl (meth)acrylate, the abovementioned monomers of formula (IV) or (V), and mixtures thereof.

Preferably, the (meth)acrylate monomer is chosen from the monomers of formulae (IV) and (V), and mixtures thereof.

Even more preferably, the (meth)acrylate monomer is chosen from the following monomers and mixtures thereof:

(IV-A)

(IV-B)
(V-A)
(V-B)
(V-C)
(V-D)

Composition A can comprise a total content of (meth) acrylate monomer(s) of greater than or equal to 30%, preferably greater than or equal to 40%, even more preferentially greater than or equal to 60% by weight relative to the total weight of composition A.

When composition B comprises a (meth)acrylate monomer, the content thereof can be greater than or equal to 40% by weight, preferably greater than or equal to 50% by weight, and advantageously greater than or equal to 60% by weight relative to the total weight of composition B.

According to one embodiment, composition B comprises at least one (meth)acrylate monomer.

Additives

The two-component composition according to the invention can comprise at least one additive chosen from the group consisting of catalysts, fillers, antioxidants, light stabilizers/UV absorbers, metal deactivators, antistatics, film-preventing agents, foaming agents, biocides, plasticizers, lubricants, emulsifiers, dyes, pigments, rheological agents, impact modifiers, adhesion promoters, optical brighteners, flame retardants, anti-sweating agents, nucleating agents, solvents, and mixtures thereof.

These additives may be present in composition A and/or composition B of the composition according to the invention.

As examples of plasticizers that may be used, mention may be made of any plasticizer normally used in the field of adhesives, for instance epoxy resins, phthalates, benzoates, trimethylolpropane esters, trimethylolethane esters, trimethylolmethane esters, glycerol esters, pentaerythritol esters, naphthenic mineral oils, adipates, cyclohexyldicarboxylates, paraffinic oils, natural oils (optionally epoxidized), polypropylenes, polybutylenes, hydrogenated polyisoprenes, and mixtures thereof.

Preferably, use is made of:
diisodecyl phthalate, as for example sold under the name Palatinol™ DIDP by BASF,
an ester of alkylsulfonic acid and of phenol, as for example sold under the name Mesamoll® by Lanxess,
diisononyl 1,2-cyclohexanedicarboxylate, as for example sold under the name Hexamoll Dinch® by BASF,
pentaerythritol tetravalerate, as for example sold under the name Pevalen™ by Perstorp,
the epoxidized soya bean oil as for example sold under the name Vikoflex® 7170 by Arkema.

As examples of (thixotropic) rheological agent(s) that may be used, mention may be made of any rheological agent customarily used in the field of adhesive compositions.

Preferably, the thixotropic agents are chosen from:
PVC plastisols, corresponding to a suspension of PVC in a plasticizing agent which is miscible with PVC, obtained in situ by heating to temperatures ranging from 60° C. to 80° C. These plastisols can be those described in particular in the publication Polyurethane Sealants, Robert M. Evans, ISBN 087762-998-6,
fumed silica, as for example sold under the name HDK® N20 by Wacker;
urea derivatives resulting from the reaction of an aromatic diisocyanate monomer, such as 4,4'-MDI, with an aliphatic amine, such as butylamine. The preparation of such urea derivatives is described notably in application FR 1 591 172;
micronized amide waxes, such as Crayvallac® SLT or Crayvallac® SLA sold by Arkema.

The composition according to the invention may also comprise at least one organic and/or mineral filler.

The mineral filler(s) that may be used are advantageously chosen so as to improve the mechanical performance of the composition according to the invention in the crosslinked state.

As examples of mineral filler(s) that may be used, use may be made of any mineral filler(s) usually used in the field of adhesive compositions. These fillers are typically in the form of particles of diverse geometry. They may be, for example, spherical or fibrous or may have an irregular shape.

Preferably, the filler(s) are chosen from the group consisting of clay, quartz, carbonate fillers, kaolin, gypsum, clays and mixtures thereof; preferentially, the filler(s) are chosen from carbonate fillers, such as alkali metal or alkaline-earth metal carbonates, and more preferentially calcium carbonate or chalk.

These fillers may be untreated or treated, for example using an organic acid, such as stearic acid, or a mixture of organic acids predominantly consisting of stearic acid.

Use may also be made of hollow mineral microspheres, such as hollow glass microspheres, and more particularly those made of calcium sodium borosilicate or of aluminosilicate.

The composition according to the invention may also comprise at least one adhesion promoter, preferably chosen from silanes, such as aminosilanes, epoxysilanes or acryloyl silanes, or adhesion promoters based on a phosphate ester, such as for example the 2-hydroxyethyl methacrylate phosphate ester, 2-methacryloyloxyethyl phosphate, bis(2-methacryloyloxyethyl phosphate), 2-acryloyloxyethyl phosphate, bis(2-acryloyloxyethyl phosphate), methyl-(2-methacryloyloxyethyl phosphate), ethyl-(2-methacryloyloxyethyl phosphate), a mixture of 2-hydroxyethyl methacrylate mono- and diphosphate esters.

When a solvent, in particular a volatile solvent, is present in the composition, its content is preferably less than or equal to 5% by weight, more preferably less than or equal to 3% by weight, relative to the total weight of the composition.

Preferably, the content of solvent(s) in the composition is between 0% and 5% by weight.

When a pigment is present in the composition, its content is preferably less than or equal to 3% by weight, more preferably less than or equal to 2% by weight, relative to the total weight of the composition. When it is present, the pigment can, for example, represent from 0.1% to 3% by weight or from 0.4% to 2% by weight of the total weight of the composition. The pigments can be organic or inorganic pigments.

For example, the pigment is $TiO_2$, in particular Kronos® 2059 sold by Kronos.

The composition can comprise an amount of from 0.1% to 3%, preferably from 1% to 3%, by weight of at least one UV stabilizer or antioxidant. These compounds are typically introduced in order to protect the composition from degradation resulting from a reaction with oxygen which is liable to be formed by the action of heat or light. These compounds can include primary antioxidants which trap free radicals. The primary antioxidants can be used alone or in combination with other secondary antioxidants or UV stabilizers.

Mention may be made, for example, of Irganox® 1010, Irganox® B561, Irganox® 245, Irgafos® 168, Tinuvin® 328 or Tinuvin™ 770, which are sold by BASF.

The composition may comprise at least one acrylic block copolymer. The acrylic block copolymers are typically impact modifiers.

The acrylic block copolymers can be copolymers comprising:

from 1% to 99% of at least one rigid block (A), the glass transition temperature of which is greater than the ambient temperature by at least 20° C.;

from 1% to 99% by weight of at least one flexible block (B), the glass transition temperature of which is less than the ambient temperature by at least 10° C.

Preferably, the copolymers are tri blocks comprising rigid block/flexible block/rigid block, in which:

at least one rigid block (A) of the copolymer advantageously consists of monomer units derived from at least one methacrylate of formula $CH_2\!=\!C(CH_3)\!-\!COOR_i$ where $R_i$ is a linear or branched $C_1$-$C_3$ alkyl group, a branched $C_4$ group, a $C_3$-$C_8$ cycloalkyl group, a $C_6$-$C_{20}$ aryl group, a $C_7$-$C_{30}$ arylalkyl group containing a $C_1$-$C_4$ alkyl group, a heterocyclic group or a heterocyclylalkyl group containing a $C_1$-$C_4$ alkyl group; and the flexible block (B) advantageously contains:
(i) monomeric units derived from at least one alkyl acrylate of formula $CH_2\!=\!CH\!-\!COOR_j$ where $R_j$ is a linear or branched $C_1$-$C_{12}$ alkyl group, and/or
(ii) monomeric units derived from at least one methacrylate of formula $CH_2\!=\!C(CH_3)\!-\!COOR_k$ where $R_k$ is a linear $C_4$-$C_{12}$ alkyl group or a branched $C_5$-$C_{12}$ alkyl group.

The rigid block (A) preferably comprises monomeric units derived from methyl methacrylate monomers.

The rigid block (A) may also comprise at least one dialkylacrylamide monomer, the linear or branched alkyl groups of which comprise from 1 to 10 carbon atoms, such as N,N-dimethylacrylamide.

The flexible block (B) preferably comprises monomeric units derived from at least one monomer chosen from butyl acrylate, 2-ethylhexyl acrylate, hydroxyethyl acrylate, 2-ethylhexyl methacrylate, n-octyl acrylate, and mixtures thereof.

Preferentially, the copolymer is a polymethyl methacrylate/poly(n-butyl acrylate)/polymethyl methacrylate block copolymer.

Among the acrylic block copolymers, mention may for example be made of Nanostrength® sold by Arkema (M52 comprising 52% by weight of poly(n-butyl acrylate), or M75 comprising approximately 75% by weight of poly(n-butyl acrylate), or M65 comprising approximately 65% by weight of poly(n-butyl acrylate)).

The composition can comprise at least one urethane-acrylate having a number-average molecular weight of greater than or equal to 2000 g/mol, preferentially greater than or equal to 4000 g/mol.

The urethane-acrylate can be obtained by reaction between a polyol and a polyisocyanate, followed by functionalization with for example hydroxymethyl methacrylate.

There are numerous commercially available urethane-acrylates.

Composition B can comprise at least one epoxy resin.

The epoxy resin may be aliphatic, cycloaliphatic, heterocyclic or aromatic.

The epoxy resin may be monomeric or polymeric.

The epoxy resins can be chosen from polyglycidyl ethers of polyphenolic compounds, preferably comprising from 2 to 6 glycidyl ether functions per mole of resin.

A phenolic compound is a compound having at least two aromatic hydroxyl groups.

The phenolic compounds can be chosen from the group consisting of resorcinol, catechol, hydroquinone, bisphenol A (2,2-bis-(4-hydroxyphenyl)propane), bisphenol AP (1,1-bis(4-hydroxyphenyl)-1-phenylethane), bisphenol AF (2,2-bis-(4-hydroxyphenyl)hexafluoropropane), bisphenol B ((2,2-bis(4-hydroxyphenyl)butane), bisphenol BP (bis(4-hydroxyphenyl)diphenylmethane), bisphenol C (2,2-bis(3-methyl-4-hydroxyphenyl)propane), bisphenol CII (bis(4-hydroxyphenyl)-2,2-dichloroethylene), bisphenol E (1,1-bis(4-hydroxyphenyl)ethane), bisphenol F (bis(4-hydroxyphenyl)-2,2-dichloroethylene), bisphenol FL (4,4'-(9H-fluoren-9-ylidene)bisphenol, bisphenol G (2,2-bis(4-hydroxy-3-isopropylphenyl)propane), bisphenol M (1,3-bis (2-(4-hydroxyphenyl)-2-propyl)benzene), bisphenol P (1,4-bis(2-4-hydroxyphenyl)-2-propyl)benzene), bisphenol PH (5,5'-(1-methylethylidene)-bis[1,1'-(bisphenyl)-2ol]propane), bisphenol S (bis(4-hydroxyphenyl)sulfone), bisphenol TMC (1,1-bis(4-hydroxyphenyl)-3,3,5-trimethylcyclohexane); bisphenol Z (1,1-bis(4-hydroxyphenyl) cyclohexane), bisphenol K, tetraethylbiphenol, and mixtures thereof.

The epoxy resin can have an epoxy function content ranging from 0.3 to 10.8 meq per gram of resin.

Numerous epoxy resins are typically commercially available. Mention may for example be made of the D.E.R.™ 331 and D.E.R.™ 383 resins sold by Dow Chemical, the Epon 862 resin sold by Hexion Speciality Chemicals, the Eposir® resins based on bisphenol A sold by SIR Industrial (for example Eposir® 7120), and the Eposir® resins based on bisphenol A/bisphenol F (for example Eposir® F556).

According to one preferred embodiment, composition B does not comprise any epoxy resin.

According to one embodiment, the composition A/composition B ratio by volume in the composition of the invention ranges from 20/1 to 1/1, preferentially from 10/1 to 1/1. The present invention preferably relates to a two-component composition comprising:

a composition A comprising:
at least one reducing agent;
at least one (meth)acrylate monomer;

a composition B comprising:
at least one oxidizing agent; and
optionally at least one (meth)acrylate monomer;
said composition being characterized in that:
it comprises at least one radical photoinitiator in composition A and/or B;
it comprises at least one polymerization inhibitor in a content of less than or equal to 0.3% by weight relative to the total weight of said composition,
the radical photoinitiator being chosen from the following radical photoinitiators:
the family of the phosphine oxides, such as, for example, diphenyl(2,4,6-trimethylbenzoyl)phosphine oxide (TPO), ethyl(2,4,6-trimethylbenzoyl)phenylphosphine oxide (TPO-L) and bis(2,6-dimethoxybenzoyl)-2,4,4-trimethylphenylphosphine oxide (BAPO);
the family of the thioxanthones, such as, for example, isopropylthioxanthone (ITX), 2,4-diethylthioxanthone, 2,4-dimethylthioxanthone, 2-chlorothioxanthone and 1-chloro-4-isopropylthioxanthone;
the radical photoinitiator being even more preferentially chosen from diphenyl-(2,4,6-trimethylbenzoyl)phosphine oxide (TPO), ethyl-(2,4,6-trimethylbenzoyl)phenylphosphine oxide (TPO-L) and bis-(2,6-dimethoxybenzoyl)-2,4,4-trimethylphenylphosphine oxide (BAPO), and
the (meth)acrylate monomer being chosen from the compounds of formula (IV) or (V) below:

in which:
$R^7$ represents H or a methyl;
$R^8$ represents H or ethyl;
p represents 0 or 1; and
Z represents H, =O, a linear or branched alkyl group, a benzyl group, an aryl group or an alkoxy group.

B. Ready-to-Use Kit

The present invention also relates to a ready-to-use kit, comprising, on the one hand, composition A as defined above and, on the other hand, composition B as defined above, packaged in two separate compartments. It may for example be a two-component cartridge.

Specifically, the composition according to the invention may be in a two-component form, for example in a ready-to-use kit, comprising composition A, on the one hand, in a first compartment or drum and composition B, on the other hand, in a second compartment or drum, in proportions suitable for direct mixing of the two components, for example by means of a metering pump.

According to one embodiment of the invention, the kit also comprises one or more means for mixing compositions A and B. Preferably, the mixing means are chosen from metering pumps and static mixers of diameter suited to the amounts used.

C. Uses of the Compositions

The present invention also relates to the use of a composition as defined above as adhesive, sealant or coating, preferably as adhesive.

The invention also relates to the use of said composition in the repair and/or the structural or semi-structural adhesive bonding of materials in the transportation, motor vehicle (car, bus or truck), assembly, marine, electronics or construction field.

The invention also relates to the use of said composition in the repair and/or the structural or semi-structural adhesive bonding of materials in the transportation, motor vehicle (car, bus or truck), assembly, marine or construction field.

The present invention also relates to a method for assembling two substrates by adhesive bonding, comprising:
the coating, onto at least one of the two substrates to be assembled, of a composition obtained by mixing compositions A and B as defined above; then
actually bringing the two substrates into contact;
crosslinking the composition by submission to electromagnetic irradiation.

The crosslinking step can be carried out at a temperature of between 0° C. and 200° C., preferably between 10° C. and 150° C., preferably between 23 and 80° C. and in particular between 20° C. and 25° C.

The electromagnetic irradiation can be produced with a UV radiation source or with an LED.

The crosslinking step under electromagnetic irradiation can be carried out at a wavelength ranging from 200 to 500 nm.

Preferably, the electromagnetic irradiation step is carried out with an intensity of less than or equal to 300 mW/cm$^2$, preferentially less than or equal to 200 mW/cm$^2$, for example less than or equal to 100 mW/cm$^2$.

The appropriate substrates are, for example, inorganic substrates, such as concrete, metals or alloys (such as aluminium alloys, steel, non-ferrous metals and galvanized metals); or else organic substrates, such as wood, plastics, such as PVC, polycarbonate, PMMA, polyethylene, polypropylene, polyesters, epoxy resins; substrates made of metal and composites coated with paint.

The compositions according to the invention advantageously allow rapid polymerization and polymerization which takes place at the surface and at depth. In addition, the surface of the crosslinked compositions dry rapidly and are not tacky, thereby advantageously making it possible to increase the productivity of industrial processes.

The compositions according to the invention advantageously allow a good compromise between storage stability and high reactivity.

Moreover, one of the advantages of the compositions of the invention is that they make it possible to surface-crosslink and deep-crosslink the shadow areas which have not been irradiated.

The compositions according to the invention advantageously exhibit, after crosslinking, good adhesive properties.

All the embodiments described above may be combined with each other. In particular, the various abovementioned constituents of the composition, and notably the preferred embodiments of the composition, may be combined with each other.

In the context of the invention, the term "of between x and y" or "ranging from x to y" is understood to mean an interval in which the limits x and y are included. For example, the range "of between 0% and 25%" includes in particular the values 0% and 25%.

The invention is now described in the following implementation examples, which are given purely by way of illustration and should not be interpreted in order to limit the scope thereof.

EXAMPLES

The following ingredients were used:

Speedcure® TPO (CAS: 75980-60-8) sold by Lambson: 2,4,6-trimethylbenzoyldiphenylphosphine;

Speedcure® TPO-L (CAS: 84434-11-7) sold by Lambson: ethyl (2,4,6-trimethylbenzoyl) phenyl phosphinate;

Bisomere® PTE (CAS number: 103671-44-9) sold by GEO Specialty Chemicals;

Retic™ BP50 sold by Arkema is benzoyl peroxide (48-52% weight/weight) in an Isononyl benzoate (12-15%)/Ethylene Glycol (8-10%) mixture;

Crayvallac® SLT sold by Arkema is a micronized amide wax used as rheological agent;

Visiomer® Glyfoma (CAS: 1620329-57-9) sold by Evonik Industries and having a molar mass equal to 172.2 g/mol, mixture of glycerol formal methacrylate isomers, comprising a content of MEHQ (4-hydroxyanisole or hydroquinone monomethyl ether) of 200 ppm;

SR9054 (CAS number: 1628778-81-3) sold by Sartomer: difunctional acrylic acid adhesion promoter;

Aerosil® R202 (CAS number: 67762-90-7): a hydrophobic fumed silica (post-treated PDMS) having a specific surface area (BET) equal to 100±20 m²/g sold by Evonik;

MBS Clearstrength® XT100 sold by Arkema: core-shell impact modifier based on MBS (MMA-butadiene-styrene);

Vikoflex® 7170 sold by Arkema is an epoxidized soybean oil used as a plasticizer;

urethane-acrylate U1: obtained by reaction of a polypropylene glycol diol having a molar mass of 2000 g/mol with MDI, followed by functionalization with hydroxymethyl methacrylate. The weight-average molecular weight is 6500 g/mol and the polydispersity is 2.9.

Example 1: Preparation of Trimethylolpropane Formal Acrylate (CAS: 66492-51-1)

This product was prepared as described in JP5744273, by transesterification of methyl acrylate using trimethylolpropane formal according to the following scheme with a yield of 94%:

[Chem 8]

Example 2: Preparation of the Compositions

The Crayvallac® and the trimethylolpropane formal acrylate of Example 1, and the MEHQ are mixed in a reactor kept constantly stirred and under nitrogen at 55° C. for 1 h. The reaction mixture is then cooled to 23° C. and the other ingredients constituting component A are added in the proportions shown in the following table, at a temperature of 23° C.

The various ingredients constituting component B are mixed in the proportions shown in the following table, at a temperature of 23° C., in a reactor kept constantly stirred and under nitrogen.

| Composition No. 1 | | | |
|---|---|---|---|
| Component A | | Component B | |
| ingredients | % by weight (relative to the total weight of A) | ingredients | % by weight (relative to the total weight of B) |
| Trimethylolpropane formal acrylate (Example 1) | 95 | Retic BP 50 | quantity sufficient to reach 100% |
| MEHQ | 855 ppm | Trimethylolpropane formal acrylate (Example 1) | 98 |
| Speedcure® TPO | 1 | MEHQ | 882 ppm |
| Bisomere® PTE | 1 | | |
| Crayvallac® SLT | quantity sufficient to reach 100% | | |
| Total | 100 | Total | 100 |

Component A and component B above were mixed, in a 1:1 ratio by volume.

The mixing is carried out at a temperature of approximately 23° C., according to the given ratio by volume, with a static mixer, and then the mixture was irradiated under LED at 405 nm with an intensity of 100 mW/cm².

| Comparative composition No. 2 | | | |
|---|---|---|---|
| Component A | | Component B | |
| Ingredients | % by weight (relative to the total weight of A) | Ingredients | % by weight (relative to the total weight of B) |
| Trimethylolpropane formal acrylate (Example 1) | 97 | Retic BP 50 | quantity sufficient to reach 100% |
| MEHQ | 873 ppm | Trimethylolpropane formal acrylate (Example 1) | 98 |
| Bisomere® PTE | 1 | MEHQ | 882 ppm |
| Crayvallac® SLT | quantity sufficient to reach 100% | | |
| TOTAL | 100 | TOTAL | 100 |

Component A and component B above were mixed, in a 1:1 ratio by volume.

The mixing is carried out at a temperature of approximately 23° C., according to the given ratio by volume, with a static mixer.

Figure 1:
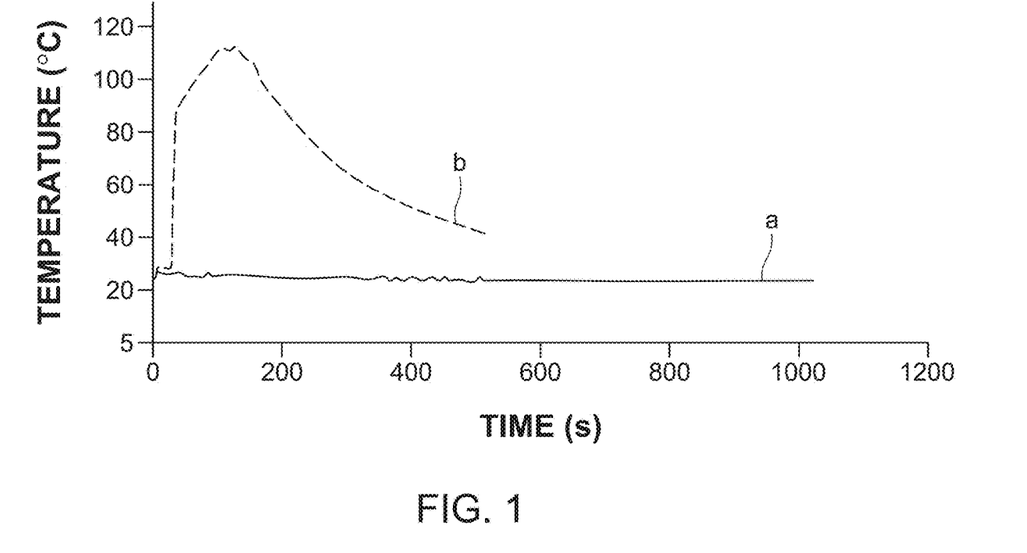
FIG. 1 represents T(° C.)=f (time in seconds) which is obtained with composition No. 1 (curve b) and comparative composition No. 2 (curve a).

FIG. 1 represents T(° C.)=f(time in seconds) which is obtained with composition No. 1 (curve b) and comparative composition No. 2 (curve a). This optical pyrometry test makes it possible to determine the exothermicity of the reaction and the lag time, that is to say the time required by the sample in order to begin to polymerize. This time is the pot life.

FIG. 1 shows that comparative composition No. 2 (absence of photoinitiator, curve a) does not polymerize in the absence of photoinitiator and of irradiation with an LED. Conversely, composition No. 1 according to the invention (curve b) polymerizes very rapidly since an exotherm (temperature peak) is observed from the first seconds of irradiation.

In addition, it was observed that the polymer obtained is advantageously dry at the surface (tack-free).

Example 3: Composition No. 3

The Crayvallac® and the Visiomer Glyfoma are mixed in a reactor kept constantly stirred and under nitrogen at 55° C. for 1 h. The reaction mixture is then cooled to 23° C. and the other ingredients constituting component A are added in the proportions shown in the following table, at a temperature of 23° C.

The various ingredients constituting component B are mixed in the proportions shown in the following table, at a temperature of 23° C., in a reactor kept constantly stirred and under nitrogen.

| Composition No. 3 | | | |
|---|---|---|---|
| Component A | | Component B | |
| ingredients | % by weight (relative to the total weight of A) | ingredients | % by weight (relative to the total weight of B) |
| Visiomer Glyfoma (including 200 ppm MEHQ) | 96 | Retic BP 50 | 1 |
| Speedcure® TPO-L | 1 | Visiomer Glyfoma (including 200 ppm MEHQ) | 99 |
| Bisomere® PTE | 1 | | |
| Crayvallac® SLT | 2 | | |
| TOTAL | 100 | TOTAL | 100 |

Component A and component B above were mixed, in a 1:1 ratio by volume.

The mixing is carried out at a temperature of approximately 23° C., according to the given ratio by volume, with a static mixer, and then the mixture was irradiated under LED at 405 nm with an intensity of 100 mW/cm².

It was observed by pyrometric monitoring that composition No. 3 according to the invention polymerizes very rapidly since an exotherm (temperature peak at 104° C.) is observed from the first seconds of irradiation (pot life=30 s). In addition, it was observed that the polymer obtained is advantageously dry at the surface (tack-free), thus the oxygen did not have time to inhibit the surface. The combination of the photo activated redox system advantageously makes it possible to improve the surface polymerization under air.

Example 4: Accelerated Ageing Test

An accelerated ageing test was carried out at 50° C. and in the dark with composition A of composition No. 1 of Example 1. The composition was placed in an incubator at 50° C. for 12 days.

At the end of the 12 days, the mixing of compositions A and B of composition No. 1 was carried out in a 1:1 ratio by volume at 23° C. with a static mixer, and then the mixture was irradiated under LED at 405 nm with an intensity of 100 mJ/cm².

It was observed by pyrometric monitoring that composition No. 1 according to the invention is virtually identical to composition No. 1 having undergone the accelerated ageing (temperature peak at 101° C. with a pot life of 32 s). Thus, the reactivity of composition No. 1 is advantageously stable over time.

Example 5: Polymerization in the Shadow Areas

Compositions No. 1 (Example 1) and No. 3 (Example 3) were tested in polymerization in the shadow areas. A portion of the sample (mixture) is hidden so as to have an obstacle-to-light effect. The other portion is irradiated for two minutes with an LED at 405 nm with an intensity of 100 mW/cm². The sample is then left in the dark and monitored at various times in order to see the propagation of the polymerization in the non-irradiated area by virtue of the second mechanism of the redox reaction which does not require light. Complete polymerization (shadow areas included) of the samples was observed in 1 h 30.

Example 6: Adhesive Bonding Tests—Compositions No. 4 and No. 5

The Crayvallac® and the Visiomer Glyfoma are mixed in a reactor kept constantly stirred and under nitrogen at 55° C. for 1 h. The mixture is then brought back down to 23° C. and the other ingredients constituting component A are added in the proportions shown in the following table, at a temperature of 23° C.

The various ingredients constituting component B are mixed in the proportions shown in the following table, at a temperature of 23° C., in a reactor kept constantly stirred and under nitrogen.

| Composition No. 4 | | | |
|---|---|---|---|
| Component A | | Component B | |
| ingredients | % by weight (relative to the total weight of A) | ingredients | % by weight (relative to the total weight of B) |
| Visiomer Glyfoma (including 200 ppm MEHQ) | 36 | Retic BP 50 | 20 |
| Urethane acrylate U1 | 40 | Vikoflex 7170 | 75 |
| Speedcure® TPO-L | 1 | Crayvallac® SLT | 5 |
| Bisomere® PTE | 1 | | |
| Methacrylic acid | 1 | | |
| XT100 | 17 | | |
| Silica R202 | 3 | | |
| SR9054 | 1 | | |
| TOTAL | 100 | TOTAL | 100 |

Composition No. 5 (comparative)

| ingredients | Component A % by weight (relative to the total weight of A) | ingredients | Component B % by weight (relative to the total weight of B) |
|---|---|---|---|
| Visiomer Glyfoma (including 200 ppm MEHQ) | 37 | Retic BP 50 | 20 |
| Urethane acrylate U1 | 40 | Vikoflex 7170 | 75 |
|  |  | Crayvallac ® SLT | 5 |
| Bisomere ® PTE | 1 |  |  |
| Methacrylic acid | 1 |  |  |
| XT100 | 17 |  |  |
| Silica R202 | 3 |  |  |
| SR9054 | 1 |  |  |
| TOTAL | 100 | TOTAL | 100 |

Figure 2:
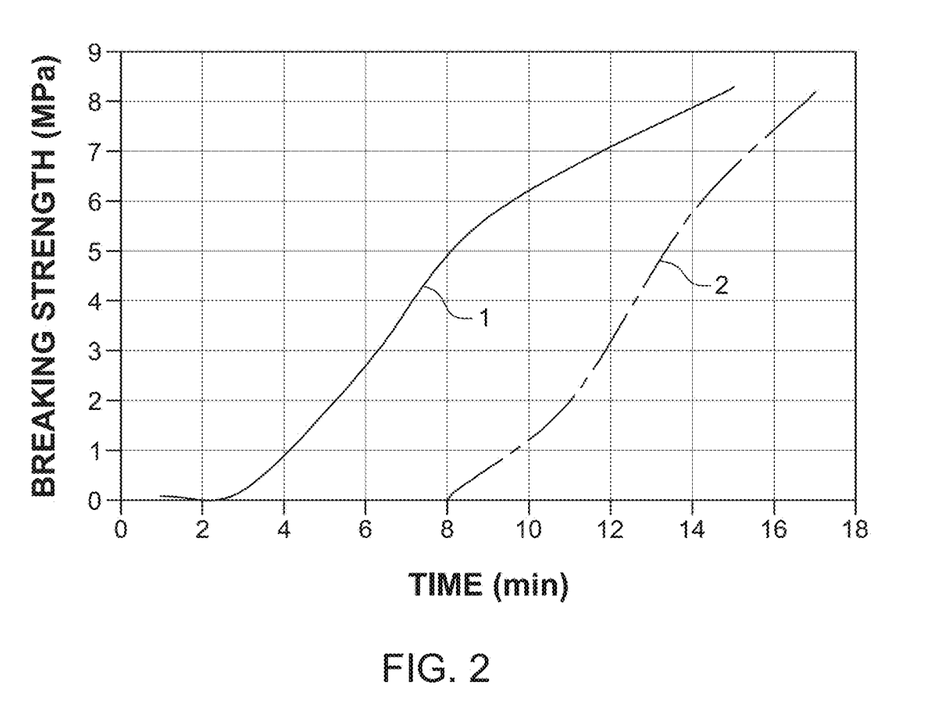
FIG. 2 describes a graph representing the breaking strength (in MPa)=f(time in min) for compositions No. 4 (curve 1) and No. 5 (curve 2, comparative).

Component A and component B above were mixed, in a 1:1 ratio by volume.
The mixing is carried out at a temperature of approximately 23° C., according to the given ratio by volume, with a static mixer, and then the mixture was irradiated under LED at 405 nm with an intensity of 100 mW/cm².
Adhesive Bonding Tests
The adhesive bondings are produced on strips made of aluminium originating from Rocholl. An area of 25×12.5 mm was delimited on a strip using wedges made of Teflon with a thickness of 250 µm. This area was filled with the test composition and then a second strip of the same material was laminated. The combination was held by a clamp and placed in a climate-controlled chamber at 23° C. or at 100° C. and 50% RH (relative humidity) for a week before tensile testing on a universal testing machine. Insolation on the section for 30 seconds.
The aim of the tensile testing on a universal testing machine is to evaluate the maximum force (in MPa) to be exerted on the assemblage in order to separate it. Recourse to a tensile testing device makes it possible to subject a lap joint placed between two rigid supports to a shear stress up to failure by exerting tension on the supports parallel to the surface of the assemblage and to the main axis of the test specimen. The result to be recorded is the breaking force or stress. The shear stress is applied via the movable jaw of the tensile testing device with a displacement at the rate of 5 mm/min. This tensile testing method is carried out as defined by the standard EN 1465 of 2009.
FIG. 2 describes a graph representing the breaking strength (in MPa)=f(time in min) for compositions No. 4 (curve 1) and No. 5 (curve 2, comparative).
FIG. 2 shows that composition No. 4 according to the invention (curve 1) exhibits a faster increase in cohesion than comparative composition No. 5 (curve 2).

The invention claimed is:

1. Two-component composition comprising:
a composition A comprising:
    at least one reducing agent; and
    at least one (meth)acrylate monomer;
a composition B comprising:
    at least one oxidizing agent; and
    optionally at least one (meth)acrylate monomer;
said composition being characterized in that:
it comprises at least one radical photoinitiator in composition A and/or B; and
it comprises at least one polymerization inhibitor in a content of less than or equal to 0.3% by weight relative to the total weight of said composition,
the radical photoinitiator being selected from the group consisting of:
    radical photoinitiators of type I selected from the group consisting of:
        the family of the acetophenones and alkoxyacetophenones;
        the family of the hydroxyacetophenones;
        the family of the alkylaminoacetophenones;
        the family of the benzoin ethers;
        the family of the phosphine oxides; and
        the family of the metallocenes;
    radical photoinitiators of type II selected from the group consisting of:
        the family of the benzophenones;
        the family of the thioxanthones;
        the family of the benzoylformate esters;
        the family of the dibenzylidene ketones; and
        the family of the coumarins;
    radical photoinitiators of the family of the dyes;
    and of mixtures thereof,
wherein the at least one reducing agent is a tertiary amine of formula (I):

in which:
m and n are, independently of one another, an integer ranging from 1 to 150;
$R^1$ represents a radical selected from the group consisting of a linear or branched, saturated or unsaturated alkyl comprising from 1 to 20 carbon atoms; a (hetero)aryl comprising from 6 to 12 carbon atoms; a cycloalkyl comprising from 3 to 12 carbon atoms;
v represents an integer ranging from 0 to 5;
$R^2$ and $R^3$ represent, independently of one another, a halogen atom, a hydrogen atom or a linear or branched alkyl group comprising from 1 to 12 carbon atoms, said alkyl group being optionally interrupted by at least one oxygen atom;
on the condition that m+n>2.

2. Composition according to claim 1, wherein the total content of polymerization inhibitor(s) is less than or equal to 0.25% by weight relative to the total weight of said composition.

3. Composition according to claim 1, wherein the total content of polymerization inhibitor(s) ranges from 0.01% to 0.20% by weight relative to the total weight of said composition.

4. Composition according to claim 1, wherein the reducing agent is selected from the group consisting of tertiary amines, sodium metabisulfite, sodium bisulfite, transition metals, azo compounds, alpha-aminosulfones, and mixtures thereof.

5. Composition according to claim 1, wherein the oxidizing agent is selected from the group consisting of peroxides, organic salts of transition metals, compounds containing a labile chlorine, and mixtures thereof.

6. Composition according to claim 1, wherein the radical photoinitiator is selected from the group consisting of:
the family of the phosphine oxides;
the family of the thioxanthones.

7. Composition according to claim 1, wherein composition B does not comprise any epoxy resin.

8. Composition according to claim 1, wherein it comprises from 0.1% to 5% by weight, of radical photoinitiator (s), relative to the total weight of the composition.

9. Composition according to claim 1, wherein the (meth) acrylate monomer is selected from the group consisting of:
compounds having formula (III) below:

$$H_2C=C(R^5)-COOR^6 \quad (III)$$

in which:
$R^5$ represents a hydrogen atom or a methyl group;
$R^6$ is selected from the group consisting of alkyls, cycloalkyls, alkenyls, cycloalkenyls, alkylaryls, arylalkyls or aryls, it being possible for said alkyls, cycloalkyls, alkenyls, cycloalkenyls, alkylaryls, arylalkyls or aryls to be optionally substituted and/or interrupted by at least one silane, one silicone, one oxygen, one halogen, one carbonyl, one hydroxyl, one ester, one urea, one urethane, one carbonate, one amine, one amide, one sulfur, one sulfonate, or one sulfone;
polyethylene glycol di(meth)acrylates;
tetrahydrofuran (meth)acrylates;
hydroxypropyl (meth)acrylate;
hexanediol di(meth)acrylate;
trimethylol propane tri(meth)acrylate;
diethylene glycol di(meth)acrylate;
triethylene glycol di(meth)acrylate;
tetraethylene glycol di(meth)acrylate;
dipropylene glycol di(meth)acrylate;
di(pentamethylene glycol) di(meth)acrylate;
diglyceryl tetra(meth)acrylate;
tetramethylene di(meth)acrylate;
ethylene di(meth)acrylate;
bisphenol A mono- and di(meth)acrylates;
bisphenol F mono- and di(meth)acrylates;
compounds of formula (IV) or (V) below:

(IV)

(V)

in which:
R7 represents H or a methyl;
R8 represents H or ethyl;
p represents 0 or 1; and
Z represents H, =O, a linear or branched alkyl group, a benzyl group, an aryl group or an alkoxy group;
mixtures thereof.

10. Composition according to claim 1, wherein the (meth) acrylate monomer is selected from the group consisting of the following monomers and mixtures thereof:

(IV-A)

(IV-B)

(V-A)

(V-B)

(V-C)

(V-D)

11. Composition according to claim 1, wherein composition A comprises a total content of (meth)acrylate monomer (s) of greater than or equal to 30%, by weight relative to the total weight of composition A.

12. Composition according to claim 1, wherein composition B comprises a total content of (meth)acrylate monomer(s) of greater than or equal to 40% by weight relative to the total weight of composition B.

13. Composition according to claim 1, wherein the composition comprises at least one additive selected from the group consisting of catalysts, fillers, antioxidants, light stabilizers/UV absorbers, metal deactivators, antistatics, film-preventing agents, foaming agents, biocides, plasticizers, lubricants, emulsifiers, dyes, pigments, rheological agents, impact modifiers, adhesion promoters, optical brighteners, flame retardants, anti-sweating agents, nucleating agents, solvents, and mixtures thereof.

14. Composition according to claim 1, wherein the composition A/composition B ratio by volume ranges from 20/1 to 1/1.

15. An adhesive, sealant, or coating comprising the composition according to claim 1.

16. Method for assembling two substrates by adhesive bonding, comprising:
    the coating, onto at least one of the two substrates to be assembled, of a composition obtained by mixing compositions A and B as defined according to claim 1; then
    actually bringing the two substrates into contact; and
    crosslinking the composition by submission to electromagnetic irradiation.

\* \* \* \* \*